United States Patent [19]

Vajda et al.

[11] Patent Number: 4,662,923

[45] Date of Patent: May 5, 1987

[54] FORMING A GOB OF MOLTEN GLASS INTO A PARISON

[75] Inventors: Vladimir Vajda, Nussbaumen; Hermann H. Nebelung; Ulrich Piesbergen, both of Zurich, all of Switzerland

[73] Assignee: Emhart Industries, Inc., Farmington, Conn.

[21] Appl. No.: 899,769

[22] Filed: Aug. 22, 1986

Related U.S. Application Data

[63] Continuation of Ser. No. 740,143, May 31, 1985, abandoned.

[30] Foreign Application Priority Data

Jun. 6, 1984 [GB] United Kingdom ............... 8414468

[51] Int. Cl.$^4$ ............................................ C03B 11/16
[52] U.S. Cl. .......................................... 65/29; 65/76; 65/83; 65/160; 65/163
[58] Field of Search ............... 65/29, 76, 83, 102, 65/104, 160, 162, 163

[56] References Cited

U.S. PATENT DOCUMENTS

| | | | |
|---|---|---|---|
| 3,180,718 | 4/1965 | Wilhelm | 65/160 X |
| 3,192,027 | 6/1965 | Wilhelm | 65/29 X |
| 3,607,194 | 9/1971 | Ayers | 65/160 |
| 4,613,352 | 9/1986 | Krumme et al. | 65/160 X |

Primary Examiner—Arthur Kellogg
Attorney, Agent, or Firm—Arthur B. Moore

[57] ABSTRACT

A plunger mechanism for use in forming a gob of molten glass into a parison comprises a cylinder (30), a piston (32) movable in the cylinder upon the introduction of hydraulic fluid, a piston rod (34), means (40) for mounting a plunger on the piston rod, a servo-mechanism (58) to control the flow of fluid, a position or velocity feedback device (60), and control means (70) responsive to the feedback device operable to control the servo-mechanism so that the plunger moves with a predetermined position against time curve.

14 Claims, 4 Drawing Figures

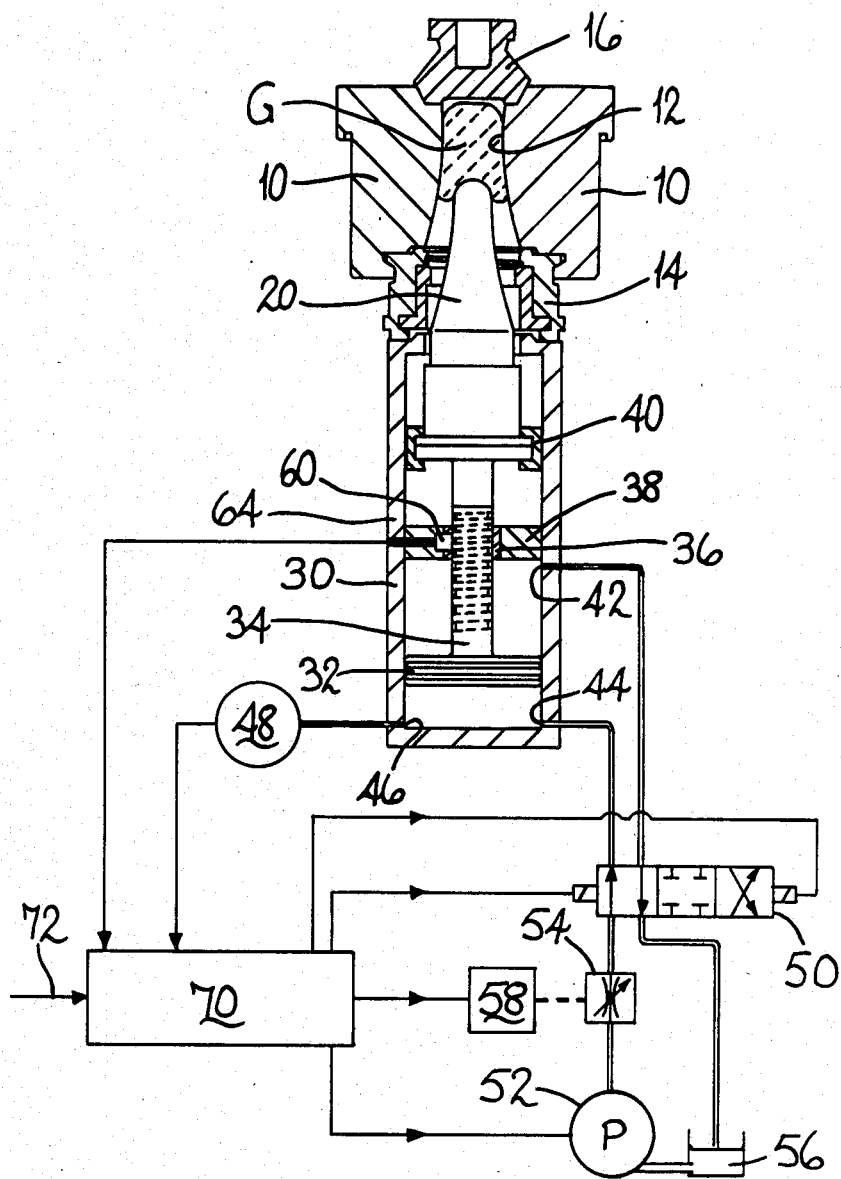
Fig_1

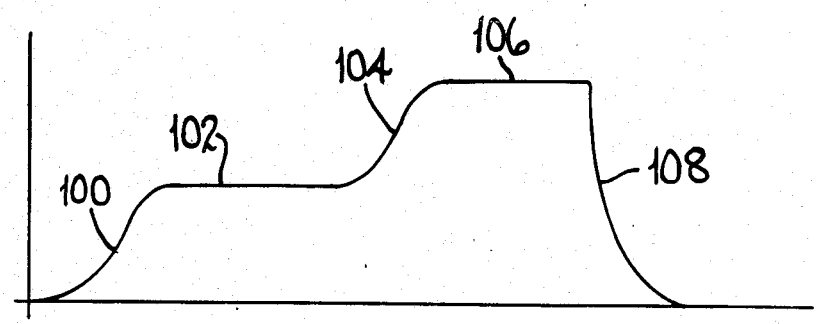
Fig_2
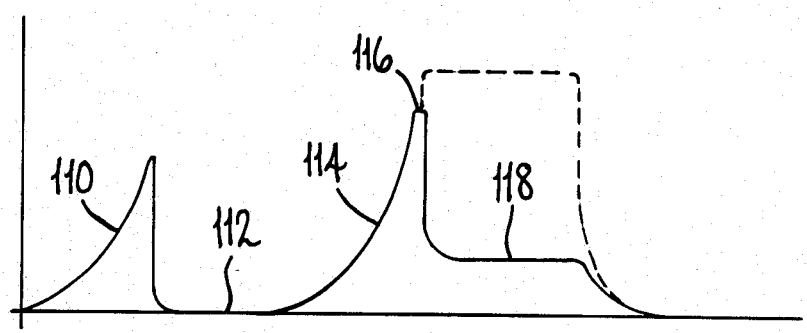
Fig_3
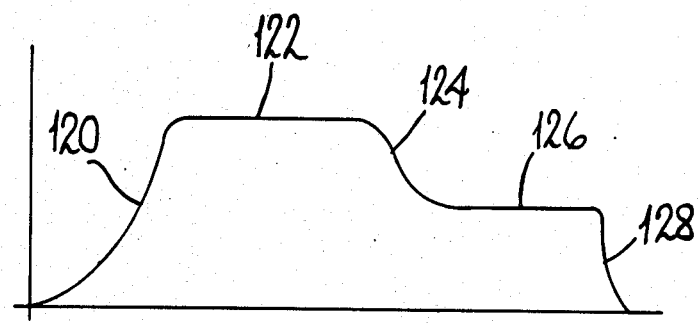
Fig_4

FORMING A GOB OF MOLTEN GLASS INTO A PARISON

This is a continuation of co-pending application Ser. No. 740,143, filed on May 31, 1985, now abandoned.

BACKGROUND OF THE INVENTION

This invention is concerned with a plunger mechanism for use in forming a gob of molten glass into a parison in a glassware forming machine and with methods of forming a gob of molten glass into a parison.

In forming glassware containers, a gob of molten glass is first formed into a parison and the parison is transferred to a mould in which it is blown into the shape of a container. Gobs of molten glass are formed into parisons either by a pressing operation or by a blowing operation and both such operations involve the use of a plunger mechanism. Conventional plunger mechanisms comprise a piston and cylinder assembly operable by the introduction of air under pressure into the cylinder to move the piston, a piston rod projecting from the piston, and means for mounting a plunger on the piston rod outside the cylinder so that the plunger moves with the piston. In most cases, the mechanism also comprises means for moving the piston into an intermediate position between its end positions, although, in some cases, this can be dispensed with. Where the parison is formed by a pressing operation, the plunger is, in most cases, moved from an out-of-the-way position thereof into an intermediate, loading, position in which the plunger projects into a mould cavity and a gob of molten glass is introduced into the mould cavity so that it rests on the plunger. The plunger is then moved from its intermediate position into an operative, pressing, position in which the plunger presses the glass against the walls of the cavity which are in the shape of the required parison. The plunger is then moved from its operative position to its out-of-the-way position to allow removal of the parison from the mould cavity. Where the parison is formed by a blowing operation, the plunger is, in most cases, moved from an out-of-the-way position thereof to an operative, loading, position in which the plunger projects into a mould cavity so that a gob of molten glass introduced into the mould cavity rests on the plunger. While the plunger is in its operative position, air is blown into the mould to cause the gob to settle on the plunger. The plunger is then moved from its operative position to an intermediate, counter-blowing, position thereof thereby creating a cavity in the gob into which air is blown to cause the gob to expand and the glass to be pressed against the walls of the cavity to form a parison. The plunger is then moved from its intermediate position to its out-of-the-way position to allow removal of the parison from the mould.

In conventional plunger mechanisms operated pneumatically, the time at which the plunger leaves its various positions is controlled by electronic or other timing means which controls the operation of valves which supply air under pressure to the cylinder of the plunger mechanism. However, there is no control over the time of arrival of the plunger in its various positions nor over the position or velocity against time curve followed by the plunger during its various movements.

It is an object of the present invention to provide a plunger mechanism for use in forming a gob of molten glass into a parison in which the position or velocity against time curve for the movement of the plunger is predetermined.

BRIEF SUMMARY OF THE INVENTION

The invention provides a plunger mechanism for use in forming a gob of molten glass into a parison in a glassware forming machine by moving a plunger between an operative position in which it engages molten glass in a mould, and an out-of-the-way position in which the plunger is clear of the mould cavity, the plunger also being movable if necessary into an intermediate position between the operative and out-of-the-way positions thereof, the mechanism comprising a cylinder, a piston movable in the cylinder upon the introduction of hydraulic fluid under pressure into the cylinder, a piston rod projecting from the piston through a seal in an end cap of the cylinder, means for mounting a plunger on the piston rod outside the cylinder so that the plunger moves with the piston, a servo-mechanism operable to control the rate at which hydraulic fluid enters and/or leaves the cylinder, a position or velocity feedback device operable to provide a signal or signals indicating the position or velocity of the piston and hence of a plunger mounted on the piston rod, and control means responsive to the signal or signals of the position or velocity feedback device and operative to control the servo-mechanism so that the piston and hence a plunger mounted on the piston rod moves with a predetermined position or velocity against time curve.

In a plunger mechanism in accordance with the last preceding paragraph, control of the motion between the various positions of the plunger is provided so that a more efficient glass parison making operation can be performed. Furthermore, the time of arrival of the plunger in its various positions can be controlled. The mechanism, in contrast to existing pneumatically-operated mechanisms, does not require a separate means for moving the plunger into its intermediate position since the intermediate position can be precisely controlled by shutting off the supply or by servo-control of the supply and/or the exhaust of hydraulic fluid from the cylinder.

Where the parison is formed by a pressing operation it may be desirable to vary the pressure applied to the glass by the plunger while the plunger is pressing the glass against the cavity walls. In a conventional pneumatically-operated mechanism, it is not possible to provide a predetermined pressure against time curve for this pressing. However, in a plunger mechanism in accordance with the invention, the mechanism may also comprise a pressure feedback device operative to provide a signal or signals indicating the pressure of the hydraulic fluid in the cylinder, and the control means may be responsive to the signal or signals of the pressure feedback device to control the servo-mechanism and/or the speed of a pump which supplies the hydraulic fluid so that the pressure applied by the plunger to the glass varies with a predetermined pressure against time curve.

The feedback device may be a Hall sensor which senses the passage of magnetic variations on the piston rod and produces a series of pulses. The pulses can either be used to indicate the distance moved by the piston rod, and hence the position of the plunger, or, from their frequency, to indicate the velocity of the piston rod, and hence of the plunger. The magnetic variations may be produced by cutting grooves or a screw thread into the external surface of the piston rod and, if the grooves or thread are formed on the portion of the piston rod which enters the cylinder, filling the grooves or thread or covering them with non-magnetic material.

Alternatively, the feedback device may be a linear variable differential transducer, an incremental transducer, a potentiometer, or any other suitable transducer arranged to sense, directly or indirectly, the position of the plunger. For example, a potentiometer may be connected to the piston rod to provide a signal which increases or decreases proportionally to the movement of the plunger.

The invention also provides a method of forming a gob of molten glass into a parison, the method comprising moving a plunger mounted on a piston rod projecting from a piston movable in a cylinder by introducing hydraulic fluid under pressure into the cylinder to cause the piston, and hence the plunger, to move, the plunger being moved from an out-of-the-way position to an intermediate, loading, position in which the plunger projects into a mould cavity and a gob of molten glass introduced into the mould cavity rests on the plunger, the plunger then being moved from its intermediate position into an operative, pressing, position in which the plunger presses the glass against walls of the cavity, the plunger then being moved from its operative position to its out-of-the-way position, the method comprising controlling the entry and/or exit of hydraulic fluid to the cylinder so that the plunger is moved with a predetermined position or velocity against time curve.

In a method in accordance with the last preceding paragraph if desired, while the plunger is in its operative position, the pressure applied thereby to the glass may be varied with a predetermined pressure against time curve. The pressure may, for example, be brought to a maximum, then reduced and maintained at a reduced pressure for a predetermined time and then reduced to zero. Alternatively, the pressure may be brought to a predetermined level, then increased and maintained at an increased pressure for a predetermined time, and then reduced to zero.

In a method in accordance with the last preceding paragraph but one, a signal indicating the operative position of the plunger may be produced and used to control the quantity of glass introduced into the mould in subsequent parison forming operations. If the method involves the use of a position feedback device to control the movement of the plunger, the device can be used to produce the aforementioned signal. The operative position indicates the quantity of glass in the mould and hence whether gobs are being formed correctly.

The invention also provides a method of forming a gob of molten glass into a parison, the method comprising moving a plunger mounted on a piston rod projecting from a piston movable in a cylinder by introducing hydraulic fluid under pressure into the cylinder to cause the piston, and hence the plunger, to move, the plunger being moved from an out-of-the-way position thereof to an operative, loading, position in which the plunger projects into a mould cavity so that a gob of molten glass introduced into the mould cavity rests on the plunger, the plunger than being moved from its operative position to an intermediate, counter-blowing, position thereof, the plunger then being moved from its intermediate position to its out-of-the-way position, the method comprising controlling the entry and/or exit of hydraulic fluid to the cylinder so that the plunger is moved with a predetermined position or velocity against time curve.

BRIEF DESCRIPTION OF THE DRAWINGS

There now follows a detailed description, to be read with reference to the accompanying drawings, of a plunger mechanism for use in forming a gob of molten glass into a parison in a glassware forming machine and of a method of forming a gob of molten glass into a parison in which the plunger mechanism is used. The plunger mechanism and the method are illustrative of the invention and it is to be understood that they have been selected for description by way of example and not of limitation of the invention.

In the drawings:

FIG. 1 is a diagrammatic view of the illustrative plunger mechanism;

FIG. 2 is a graph illustrating the movement of the plunger of the illustrative plunger mechanism;

FIG. 3 is a graph illustrating the pressure applied by the plunger during the illustrative method; and FIG. 4 is a graph illustrating the movement of a plunger in forming a parison by a blowing operation.

DETAILED DESCRIPTION OF PREFERRED EMBODIMENT OF THE INVENTION

The illustrative plunger mechanism is for use in forming a gob of molten glass into a parison by a pressing operation in a glassware forming machine of the individual section type. The machine comprises two mould halves 10 which are movable between a position in which they engage one another and other parts of the machine to form a mould cavity 12 and a position in which the portions 10 are spaced apart to allow removal of a parison from the mould cavity 12. The machine also comprises a neckring 14 which co-operates with the mould portions 10 in defining the cavity 12 and is arranged to grip the neck portion of a formed parison in the mould cavity 12 so that by movement of the neckring, in a well-known manner, the parison can be transferred from the mould cavity 12 to a blow mould while the side portions 10 of the mould are spaced apart. The machine also comprises a funnel (not shown) which is movable between a position on top of the side portions 10 in which it can guide a gob of molten glass G into the mould cavity 12 and an out-of-the-way position. The machine also comprises a baffle 16 which is movable into a position on top of the side portions 10 once the funnel has been removed to its out-of-the-way position. The baffle 16 provides an upper surface of the mould cavity 12 and is moved into an out-of-the-way position thereof before the parison is removed from the cavity 12. The parts 10 to 16 and the aforementioned funnel are conventional on machines of the individual section type and will be well-known to those skilled in the art. The machine may alternatively comprise a one-piece mould serving the functions of the portions 10 and the baffle 16. In this case the mould is moved vertically to allow removal of the parison. In another alternative, the funnel may be dispensed with and the portions 10 provide a guide for a gob into the cavity 12.

The illustrative plunger mechanism is for use in moving a plunger 20 between an operative, pressing, position thereof in which it engages molten glass in the mould cavity 12, an intermediate, loading, position thereof, and an out-of-the-way position in which the plunger 20 is clear of the mould cavity 12. The plunger 20 is first moved from its out-of-the-way position to its intermediate position in which the plunger projects into the mould cavity and a gob of molten glass introduced into the mould cavity 12 through the funnel falls onto and rests on the plunger 20. The plunger is then moved from its intermediate position into an operative position thereof in which the plunger 20 presses the glass against the walls of the cavity 12. In FIG. 1, the plunger is shown during its movement between its intermediate position and its operative position. The plunger is then moved from its operative position to its out-of-the-way position to allow removal of the parison created by the glass being pressed against the walls of the cavity to be removed from the cavity 12.

The illustrative plunger mechanism comprises a cylinder 30, a piston 32 movable in the cylinder 30 upon the introduction of hydraulic fluid under pressure into the cylinder, and a piston rod 34 projecting from the piston 32 through a seal 36 in an upper end cap 38 of the cylinder 30. The plunger 20 is mounted on an upper end portion of the piston rod 34 by a clamping ring 40 of conventional construction which provides means for mounting a plunger on the piston rod 34 outside the cylinder 30 so that the plunger moves with the piston 32.

The cylinder 30 has an upper entry port 42 through which hydraulic fluid under pressure can be introduced into the cylinder 30 above the piston 32 to cause the piston 32 to move downwards in the cylinder 30 and a port 44 through which hydraulic fluid under pressure can be introduced into the cylinder 30 beneath the piston 32 to cause the piston 32 to move upwardly in the cylinder 30. A further port 46 enters the cylinder 30 at a lower end portion thereof beneath the piston 32 and is connected to a pressure detector 48 which provides a pressure feedback device operative to provide a signal or signals indicating the pressure of the hydraulic fluid in the cylinder 30 beneath the piston 32. The ports 42 and 44 are connected to a three position solenoid-actuated valve 50. The valve 50 has three positions: a first position (shown in FIG. 1) in which hydraulic fluid enters the cylinder 30 through the port 44 and leaves through the port 42 so that the piston 32 moves upwardly in the cylinder 30 and the plunger 20 is moved into the mould cavity 12: a second position (achieved by moving the valve to the left viewing FIG. 1) in which the entry or exit of hydraulic fluid through the ports 42 and 44 is prevented: and a third position (reached by a further movement of the valve to the left viewing FIG. 1) in which the hydraulic fluid leaves the cylinder 30 through the port 44 and enters through the port 42 so that the piston 32 moves downwardly in the cylinder 30 and the plunger 20 is moved out of the cavity 12. The valve 50 is connected to a pump 52 via a restrictor 54 and is also connected to a tank 56. The restrictor 54 is controlled by a servo-mechanism 58 operable to vary the restrictor to control the rate at which hydraulic fluid enters or leaves the cylinder 30 through the ports 42 and 44.

The illustrative plunger mechanism also comprises a Hall sensor 60 mounted above the cylinder 30 in a cylindrical guide 64 for the plunger 20. The Hall sensor 60 is adjacent the piston rod 34 between the end cap 38 of the cylinder 30 and the plunger 20. The portion of the piston rod adjacent the Hall sensor 60 is formed with a screw thread which is covered by a sleeve of non-magnetic material. As the piston rod passes the Hall sensor 60 the Hall sensor detects the magnetic variations caused by the screw thread and produces a series of pulses which indicate the position of the piston rod 34 and hence of the plunger 20. The Hall sensor 60, therefore, provides a position feedback device operable to provide a signal or signals indicating the position of the piston 32 and hence of the plunger 20 mounted on the piston rod 34.

The illustrative plunger mechanism also comprises control means in the form of a microprocessor 70 which receives timing pulses on a line 72 from a conventional timing pulse generator (not shown) and operates the illustrative plunger mechanism in accordance with the timing pulses received. The microprocessor 70 is connected to the pressure detector 48 and the Hall sensor 60 so that it receives the signals therefrom. The microprocessor 70 is connected to the solenoid of the valve 50 so that signals from the microprocessor 70 control the position of the valve 50. The microprocessor 70 is also connected to the servo-mechanism 58 so that signals from the microprocessor control the operation of the servo-mechanism 58 and hence the condition of the restrictor 54. The microprocessor 70 is also connected to the pump 52 so that signals from the microprocessor 70 can control the speed of operation of the pump 52.

The operation of the microprocessor 70 is to control the servo-mechanism 58 so that the piston 32 and hence the plunger 20 moves with a predetermined position against time curve. Although the Hall sensor 60 provides a position feedback device, it can alternatively be used as a velocity feedback device since the frequency of its signals indicate the velocity of the piston rod. The movement of the plunger 20 can thus, be controlled in accordance with a position against time curve stored in the computer 70, a velocity against time curve, or both.

The illustrative mechanism is used in the illustrative method which is a method for forming a gob of molten glass into a parison by a pressing operation. The illustrative method comprises moving the plunger 20 mounted on the piston rod 34 by introducing hydraulic fluid under pressure into the cylinder 30 to cause the piston 32, and hence the plunger 20, to move. At the beginning of the illustrative method, the valve 50 is in its third position and the piston 32 is at the lower end of the cylinder 30 and the plunger 20 is in an out-of-the-way position thereof in which it is clear of the path of movement of the neck ring 14. In the illustrative method, the plunger is moved from the out-of-the-way position thereof to an intermediate position in which the plunger 20 projects into the mould cavity 20 and a gob of molten glass G introduced into the mould cavity 12 rests on the plunger 20. In order to move the plunger 20 from it out-of-the-way position to its intermediate position, the microprocessor 70 causes the valve 50 to move into its first position so that hydraulic fluid under pressure enters the cylinder 30 through the port 44 and the piston 32 is moved upwardly in the cylinder 30. During this movement, the computer monitors the output of the Hall sensor 60 and controls the servo-mechanism 58 in response to the signals of the Hall sensor 60 so that the plunger 20 moves in accordance with a predetermined position against time curve stored in the computer 70. FIG. 2 shows a graph of the position against time movement of the plunger 20 and a portion 100 of this graph illustrates the movement of the plunger 20 to its intermediate position. When the plunger 20 has reached the intermediate position thereof, the computer 70 causes the valve 50 to move into its second position preventing the exit or entry of hydraulic fluid into the cylinder 30. The computer 70 continues to monitor the output of the Hall sensor 60 to ensure that the plunger 20 remains in its intermediate position. The period during which the plunger is in its intermediate position is represented by the flat portion 102 of the graph shown in FIG. 2. Once the gob G has been dropped onto the plunger 20, the illustrative method continues by moving the plunger 20 from its intermediate position to an operative position in which the plunger presses the glass against the walls of the mould cavity 12. To achieve this, the computer 70 moves the valve 50 back to its first position and again monitors the movement of the plunger 20 by responding to the signals of the Hall sensor 60. The portion 104 of the graph in FIG. 2 represents the movement of the plunger to its operative position. Since the operative position of the plunger 20 is determined by the point at which the pressure between the plunger 20 and the glass in the cavity 12 stops the motion of the plunger, the computer 70 does not move the valve into its second position when the plunger is in its operative position but leaves the valve 50 in its first position. The portion 106 of the graph shown in FIG. 2 shows the dwell period of the plunger 20 in its operative position during which the plunger moves slightly into the mould cavity 12. Next in the illustrative method, the plunger is moved from its operative position to its out-of-the-way position. To achieve this the computer 70 moves the valve 50 into its third position so that hydraulic fluid is introduced into the cylinder 30 through the port 42 and the piston 32 moves downwards in the cylinder 30. During this movement, the computer 70 continues to monitor the motion by reference to the signals of the Hall sensor 60 and operates the servo-mechanism 58 so that the exhaust of hydraulic fluid from the cylinder 30 is controlled by the restrictor 54. The portion 108 of the graph shown in FIG. 2 represents this movement.

In the illustrative method, during the movement of the plunger 20 and particularly while it is in its operative position, the computer 70 monitors the pressure which is applied to the plunger by reference to the signals from the pressure detector 48. The computer controls the servo-mechanism and/or the speed of the pump 52 so that the pressure applied to the plunger is varied with a predetermined pressure against time curve. An example of a pressure against time curve is shown in FIG. 3. For a portion of the curve 110 the pressure builds up rapidly until it reaches its intermediate position. The pressure then drops to zero and remains there for a time indicated by a portion 112. The pressure builds up over a portion 114 as the plunger 20 moves to its operative position. The pressure is then maintained at its maximum for a short time indicated by the portion 116. The pressure is then reduced and maintained at a reduced pressure for a predetermined time as indicated by the portion 118. The pressure then reduces to zero as the plunger is returned to its out-of-the-way position. The dotted line in FIG. 3 illustrates an alternative pressure variation in which the pressure is further increased from the level of the portion 116 and maintained for a predetermined time.

The illustrative mechanism can also be used in a method of forming a gob of molten glass into a parison in which the parison is formed by a blowing operation. In this case, the moulds 10 will be of a different shape and the plunger will also be of a different shape but is still mounted on the piston rod 34 by means of the clamping ring 40. In such a method which is illustrated by FIG. 4, the plunger is moved from an out-of-the-way position thereof to an operative, loading, position (as indicated by the portion 120 of the graph of FIG. 4) in which the plunger projects into a mould cavity so that a gob of molten glass introduced into the mould cavity rests on the plunger. The plunger remains in the operative position for a predetermined time (indicated by portion 122). The plunger is then moved from its operative position to an intermediate, counter-blowing, position thereof to create a cavity in the glass into which air can be blown, (this movement is indicated by the portion 124), the plunger remains in its intermediate position for a predetermined time (indicated by the portion 126) and the plunger is then moved from its intermediate position to its out-of-the-way position (as indicated by the portion 128). In this method, as in the illustrative method, the entry and/or exit of hydraulic fluid is controlled so that the plunger is moved with a predetermined position against time curve.

In variations of the illustrative plunger mechanism, the servo-mechanism 58, the restrictor 54, and the valve 50 may be replaced by a servo-valve.

We claim:

1. A plunger mechanism for use in forming a gob of molten glass into a parison in a glassware forming machine by moving a plunger between an operative position in which it engages molten glass in a mould, and an out-of-the-way position in which the plunger is clear of the mould cavity, the plunger also being movable if necessary into an intermediate position between the operative and out-of-the-way positions thereof, the mechanism comprising a cylinder, a piston movable in the cylinder upon the introduction of hydraulic fluid under pressure into the cylinder, a piston rod projecting from the piston through a seal in an end cap of the cylinder, means for mounting a plunger on the piston rod outside the cylinder so that the plunger moves with the piston, further comprising a servo-control assembly for monitoring and controlling the position of said plunger and the pressure of the hydraulic fluid, comprising:

position feedback means for providing a signal indicating the position of the piston and hence of the plunger;

position control means responsive to the signal from said position feedback means, for comparing said signal with a predetermined position against time profile and for accordingly continually providing a position correction signal;

a servo-mechanism responsive to said position correction signal for continually controlling the position of said plunger;

pressure feedback means for providing at least one signal indicating the pressure of the hydraulic fluid in the cylinder;

pressure control means responsive to the at least one signal from said pressure feedback means for continually comparing said signal with a predetermined pressure against time curve to produce a pressure connection signal; and flow control means responsive to said pressure correction signal for continually controlling the rates of infeed and exhaust of hydraulic fluid to the cylinder.

2. A plunger mechanism according to claim 1, wherein the position feedback means is a Hall sensor operative to sense magnetic variations along the piston rod.

3. A plunger mechanism according to claim 1, wherein the position feedback means is a linear variable differential transducer, an incremental transducer, a potentiometer, or any other suitable transducer arranged to sense, directly of indirectly, the position of the plunger.

4. A plunger mechanism as defined in claim 1, wherein the flow control means comprises a pump, a solenoid-actuated valve, and a servo-controlled restrictor.

5. A plunger mechanism as defined in claim 1, wherein the flow control means comprises a servo-valve.

6. A plunger mechanism for use in forming a gob of molten glass into a parison in a glassware forming machine by moving a plunger between an operative position in which it engages molten glass in a mould, and an out-of-the-way position in which the plunger is clear of the mould cavity, the plunger also being movable if necessary into an intermediate position between the operative and out-of-the-way positions thereof, the mechanism comprising a cylinder, a piston movable in the cylinder upon the introduction of hydraulic fluid under pressure into the cylinder, a piston rod projecting from the piston through a seal in an end cap of the cylinder, means for mounting a plunger on the piston rod outside the cylinder so that the plunger moves with the piston, further comprising a servo-control assembly for monitoring and controlling the velocity of said plunger and the pressure of the hydraulic fluid, comprising:

velocity feedback means for providing a signal indicating the velocity of the piston and hence of the plunger;

velocity control means responsive to the signal from said velocity feedback means, for continually comparing said signal with a predetermined velocity against time profile and for accordingly providing a velocity correction signal;

a servo-mechanism responsive to said velocity correction signal for continually controlling the velocity of said plunger;

pressure feedback means for providing at least one signal indicating the pressure of the hydraulic fluid in the cylinder;

pressure control means responsive to the at least one signal from said pressure feedback means for continually comparing said signal with a predetermined pressure against time curve to produce a pressure correction signal, and flow control means responsive to said pressure correction signal for continually controlling the rates of infeed and exhaust of hydraulic fluid to the cylinder.

7. A plunger mechanism as defined in claim 6, wherein the flow control means comprises a pump, a solenoid-actuated valve, and a servo-controlled restrictor.

8. A plunger mechanism as defined in claim 6, wherein the flow control means comprises a servo valve.

9. A plunger mechanism according to claim 6, wherein the velocity feedback means is a Hall sensor operative to sense magnetic variations along the piston rod.

10. A plunger mechanism according to claim 6, wherein the velocity feedback means is a transducer selected from the class consisting of a linear variable differential transducer, an incremental transducer, and a potentiometer.

11. A method of forming a gob of molten glass into a parison, the method comprising moving a plunger mounted on a piston rod projecting from a piston movable in a cylinder by introducing hydraulics fluid under pressure into the cylinder to cause the piston, and hence the plunger, to move, the plunger being moved from an out-of-the-way position to an intermediate, loading, position in which the plunger projects into a mold cavity and a gob of molten glass introduced into the mold cavity rests on the plunger, the plunger then being moved from its intermediate position into an operative, pressing, position in which the plunger presses the glass against walls of the cavity, the plunger then being moved from operative position to its out-of-the-way position, controlling the plunger movement by sensing the velocity of the piston and hence of the plunger, to produce a plunger velocity signal;

comparing such plunger velocity signal with a predetermined velocity against time profile and providing a velocity correcting signal in response to such comparison;

continually controlling the velocity of said plunger in response to said velocity correction signal; and while the plunger is in its operative position, continually varying the pressure applied thereby to the glass in accordance with a predetermined pressure against time curve.

12. A method according to claim 11, wherein the pressure is brought to a maximum, then reduced and maintained at a reduced pressure for a predetermined time, and then reduced to zero.

13. A method according to claim 11, wherein the pressure is brought to a predetermined level, then increased and maintained at an increased pressure for a predetermined time, and then reduced to zero.

14. A method according to claim 11, further comprising the steps of sensing the operative position of the plunger and in response thereto, controlling the quantity of glass introduced into the mold in subsequent parison forming operations.

* * * * *